(12) United States Patent
Fullerton et al.

(10) Patent No.: US 8,016,330 B2
(45) Date of Patent: Sep. 13, 2011

(54) APPLIANCE SAFETY APPARATUS, SYSTEMS, AND METHODS

(75) Inventors: Larry W. Fullerton, New Hope, AL (US); Mark D. Roberts, Huntsville, AL (US); James L Richards, Fayetteville, TN (US)

(73) Assignee: Correalated Magnetics Research, LLC, New Hope, AL (US)

( * ) Notice: Subject to any disclaimer, the term of this patent is extended or adjusted under 35 U.S.C. 154(b) by 0 days.

(21) Appl. No.: 12/896,383

(22) Filed: Oct. 1, 2010

(65) Prior Publication Data
US 2011/0018659 A1    Jan. 27, 2011

Related U.S. Application Data

(63) Continuation-in-part of application No. 12/476,952, filed on Jun. 2, 2009, and a continuation-in-part of application No. 12/322,561, filed on Feb. 4, 2009, and a continuation-in-part of application No. 12/358,423, filed on Jan. 23, 2009, now Pat. No. 7,868,721, and a continuation-in-part of application No. 12/123,718, filed on May 20, 2008, now Pat. No. 7,800,471.

(60) Provisional application No. 61/278,229, filed on Oct. 2, 2009.

(51) Int. Cl.
*E05C 19/16* (2006.01)
*H01F 7/20* (2006.01)

(52) U.S. Cl. ............ 292/251.5; 335/285; 335/306

(58) Field of Classification Search .......... 335/285, 335/306; 292/251.5
See application file for complete search history.

(56) References Cited

U.S. PATENT DOCUMENTS

| | | |
|---|---|---|
| 381,968 A | 5/1888 | Tesla |
| 493,858 A | 3/1893 | Edison |
| 996,933 A | 7/1911 | Lindquist |
| 1,236,234 A | 8/1917 | Troje |
| 2,389,298 A | 11/1945 | Ellis |
| 2,570,625 A | 10/1951 | Zimmerman et al. |
| 2,722,617 A | 11/1955 | Kluwen et al. |
| 2,932,545 A | 4/1960 | Foley |
| 3,102,314 A | 9/1963 | Alderfer |
| 3,208,296 A | 9/1965 | Baermann |
| 3,288,511 A | 11/1966 | Tavano |
| 3,468,576 A | 9/1969 | Beyer et al. |
| 3,474,366 A | 10/1969 | Barney |
| 3,790,197 A * | 2/1974 | Parker ................ 292/251.5 |
| 3,802,034 A | 4/1974 | Bookless |
| 4,079,559 A | 3/1978 | Tenbrummeler |
| 4,222,489 A | 9/1980 | Hutter |
| 4,453,294 A | 6/1984 | Morita |
| 4,547,756 A | 10/1985 | Miller et al. |
| 4,629,131 A | 12/1986 | Podell |

(Continued)

FOREIGN PATENT DOCUMENTS
FR    823395    1/1938

*Primary Examiner* — Ramon M Barrera
(74) *Attorney, Agent, or Firm* — Tomas Friend

(57) ABSTRACT

An apparatus, system, and method for locking objects together comprises at least one pair of correlated magnets. First and second correlated magnetic field structures comprising the pair of correlated magnets are capable of being aligned such that an attractive force secures or locks two objects together. The apparatus, system, and method can be used to lock appliance and cabinet doors, drawers, covers for electrical outlets and light switches, and the like.

27 Claims, 7 Drawing Sheets

U.S. PATENT DOCUMENTS

| | | |
|---|---|---|
| 4,941,236 A | 7/1990 | Sherman et al. |
| 5,050,276 A | 9/1991 | Pemberton |
| 5,367,891 A | 11/1994 | Furuyama |
| 5,383,049 A | 1/1995 | Carr |
| 5,495,221 A | 2/1996 | Post |
| 5,512,732 A | 4/1996 | Yagnik et al. |
| 5,631,093 A | 5/1997 | Perry et al. |
| 5,631,618 A | 5/1997 | Trumper et al. |
| 6,072,251 A | 6/2000 | Markle |
| 6,170,131 B1 | 1/2001 | Shin |
| 6,275,778 B1 | 8/2001 | Shimada et al. |
| 6,457,179 B1 | 10/2002 | Prendergast |
| 6,467,326 B1 | 10/2002 | Garrigus |
| 6,607,304 B1 | 8/2003 | Lake et al. |
| 6,720,698 B2 | 4/2004 | Galbraith |
| 6,847,134 B2 | 1/2005 | Frissen et al. |
| 6,862,748 B2 | 3/2005 | Prendergast |
| 6,927,657 B1 | 8/2005 | Wu |
| 6,971,147 B2 | 12/2005 | Halstead |
| 7,031,160 B2 | 4/2006 | Tillotson |
| 7,066,778 B2 | 6/2006 | Kretzschmar |
| 7,207,102 B1 | 4/2007 | Roesler |
| 7,362,018 B1 | 4/2008 | Kulogo et al. |
| 7,444,683 B2 | 11/2008 | Prendergast et al. |
| 2004/0003487 A1 | 1/2004 | Reiter |
| 2005/0102802 A1 | 5/2005 | Sitbon et al. |
| 2006/0066428 A1 | 3/2006 | McCarthy et al. |
| 2006/0189259 A1 | 8/2006 | Park et al. |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |

\* cited by examiner

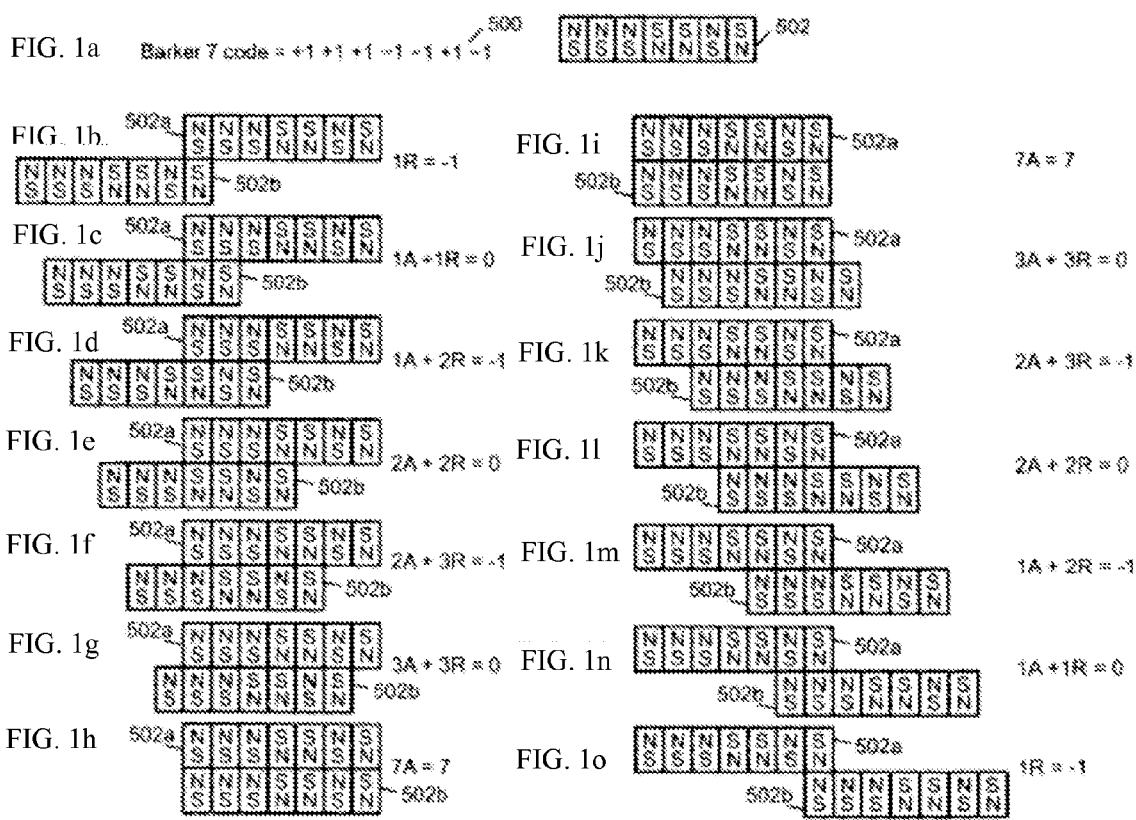
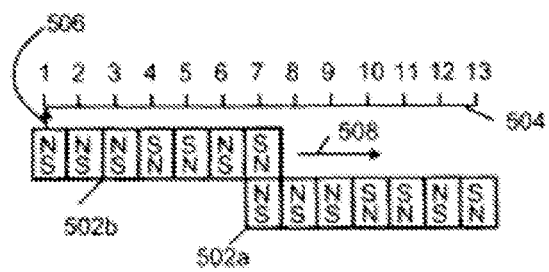
FIG. 1p

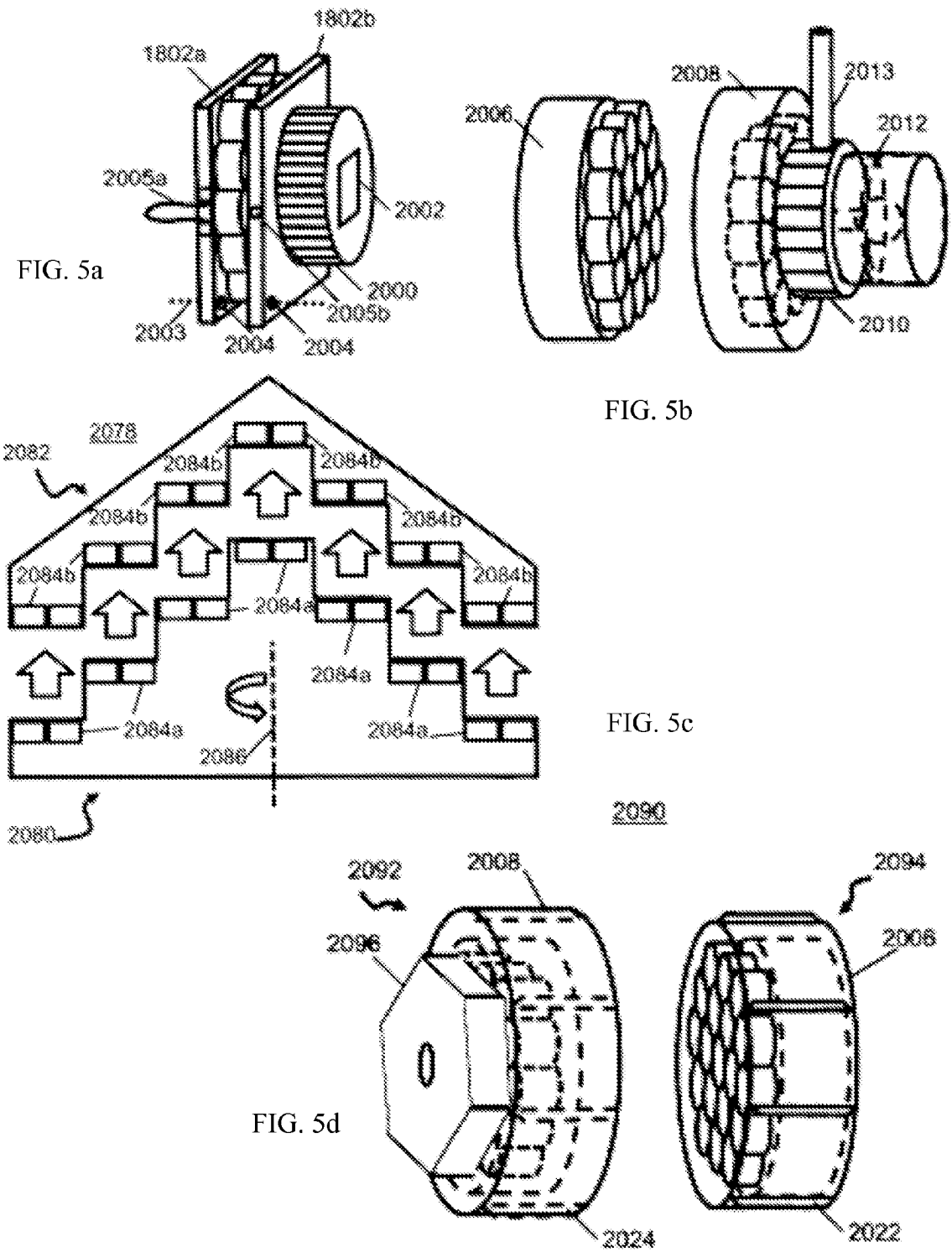

US 8,016,330 B2

APPLIANCE SAFETY APPARATUS, SYSTEMS, AND METHODS

CROSS REFERENCE TO RELATED APPLICATIONS

This patent application is a continuation-in-part of and claims priority under 35 U.S.C. 119 and 120 to U.S. Provisional Application Ser. No. 61/278,229, filed Oct. 2, 2010, and entitled "Apparatus, Systems, and Methods Using Correlated Magnets," which is incorporated herein by reference in its entirety.

This application is a continuation-in-part of and claims priority under 35 U.S.C. 120 to U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

FIELD OF THE INVENTION

The present invention relates generally to a field emission system and method. More particularly, the present invention relates to a system and method where correlated magnetic and/or electric field structures create spatial forces in accordance with the relative alignment of the field emission structures and a spatial force function.

BACKGROUND OF THE INVENTION

Household appliances, including refrigerators, ovens, microwave ovens, dish-washers, clothes washers, clothes dryers, and freezers can be hazardous to infants, mentally impaired adults, and household pets. Storage cabinets and drawers can contain hazardous chemicals and tools. Electrical outlets can be hazardous for small children. Households with toddlers and mentally impaired persons frequently require latches or locks to be placed on certain cabinets, drawers, appliances, electrical outlets, and/or appliance controls to prevent injury to developing or impaired members of the household. Commercial appliances and equipment such as autoclaves, elevators, x-ray machines, lathes, saws, and presses can be hazardous when operated by unauthorized or trained personnel.

Mechanical latches and/or locks are currently used for locking drawers, cabinet doors, and appliances and covers for appliances but they can be difficult to latch and unlatch and cause wear on appliance or cabinet surfaces. Mechanical key locks cannot be opened when a key is lost or a combination is forgotten. There is a need, therefore, for systems that allow the locking and unlocking of cabinets, drawers, appliance doors, appliance covers, and the like, that are easy to lock and unlock, minimize wear on appliance and cabinet surfaces, and that can optionally be opened, if necessary, even when locked. The present invention fills this need in the art by providing for an apparatus, systems, and methods for locking two surfaces together. The system, apparatus and method are based, in part, upon recently developed correlated magnet technology.

SUMMARY OF THE INVENTION

The present invention is an apparatus, method and system for locking appliance and cabinet doors, drawers, safety covers, and the like based, in part, on reversibly securing a surface of a first object to a surface of the same or another object using magnetic field emission systems and methods, often referred to as correlated magnets. Correlated magnets involve field emission structures comprising magnetic field sources having magnitudes, polarities, and positions corresponding to a desired spatial force function where a spatial force is created based upon the relative alignment of the field emission structures and the spatial force function. A correlated magnet comprises an array of magnetic sources (discrete magnets, printed magnetic sources or electromagnetic field emission sources) configured in accordance with a preselected code having desirable correlation properties. When a correlated magnet is brought into alignment with a complementary, or mirror image, correlated magnet, the magnetic field emission sources are aligned to produce a peak spatial attraction force. Misalignment of the complementary correlated magnets results in a configuration in which the magnetic field emission sources of the two correlated magnets substantially cancel each other out in a manner that is a function of the code according to which the field emission sources in the correlated magnets are arranged. When a correlated magnet is aligned with a duplicate correlated magnet, the magnetic field emission sources are aligned to produce a peak spatial repelling force. Misalignment of the duplicate correlated magnets results in a configuration in which the magnetic field emission sources of the two correlated magnets substantially cancel each other out as with complementary correlated magnets. Correlated magnets can be designed to have desired aligned (correlated) attracting and/or repelling spatial forces that can be used to reversibly latch and/or reversibly lock two surfaces together. The surfaces can be easily unlatched/unlocked by misaligning (decorrelating) the correlated magnets.

BRIEF DESCRIPTION OF THE DRAWINGS

FIGS. 1a-p depict alignments of two complementary magnetic field structures.

FIG. 5a-d illustrates some exemplary turning mechanisms to facilitate relative motion between correlated magnets.

FIG. 8a-f depicts correlated magnet latch mechanisms for a door of an appliance, cabinet, drawer, or electrical outlet or switch.

DETAILED DESCRIPTION OF THE INVENTION

Figure 2:
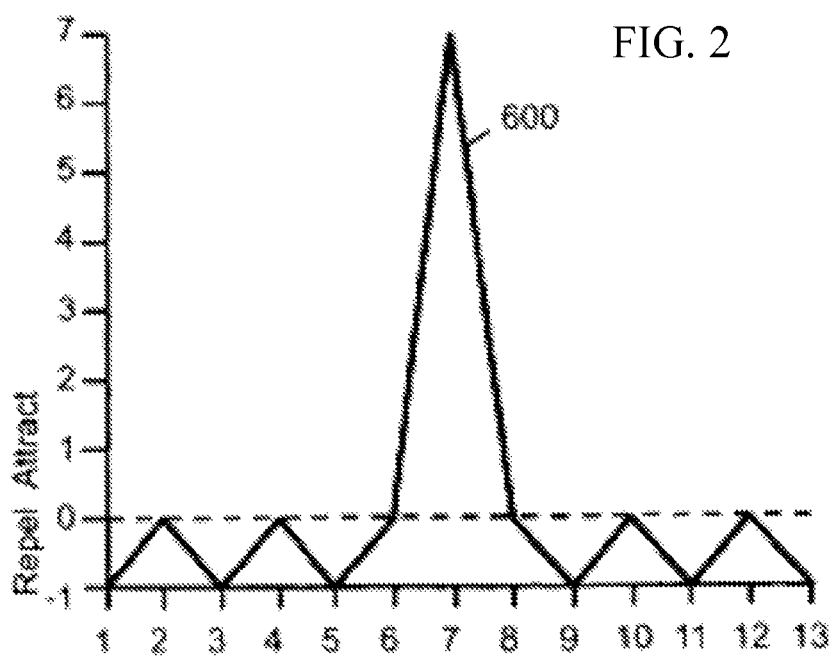
FIG. 2 depicts a spatial force function of magnetic field emission structures in FIGS. 1b-p.

Correlated magnetic technology and correlated magnets are fully described and enabled in the co-assigned issued U.S. Pat. Nos. 7,681,256 issued Mar. 23, 2010; 7,724,113 issued May 25, 2010; 7,746,205 issued Jun. 29, 2010; 7,750,773 issued Jul. 6, 2010; 7,750,774 issued Jul. 6, 2010; 7,750,779 issued Jul. 6, 2010; 7,750,780 issued Jul. 6, 2010; 7,750,781 issued Jul. 6, 2010; 7,750,778 issued Jul. 6, 2010; 7,755,462, issued Jul. 13, 2010; 7,760,058 issued Jul. 20, 2010; 7,772, 951 issued Aug. 10, 2010; 7,772,952 issued Aug. 10, 2010; 7,800,471 issued Sep. 21, 2010; 7,800,472 issued Sep. 21, 2010; and 7,800,473 issued Sep. 21, 2010 and U.S. patent application Ser. Nos. 12/123,718 filed 20 May 2008; 12/358, 423 filed 23 Jan. 2009; and 12/476,952 filed 2 Jun. 2009, which are incorporated herein by reference in their entirety. Correlated inductance, which is related to correlated magnetism, is described and enabled in U.S. patent application Ser. No. 12/322,561 filed 4 Feb. 2009 and is also incorporated by reference herein.

Correlated Magnet Technology:

Correlated magnet technology is briefly summarized here to assist the reader with understanding the present invention, but the details of correlated magnetics technology disclosed in the incorporated references are not repeated so that present invention may be described in detail. It should be understood that summary provided herein is not to be used to limit the scope of the present invention.

First and second correlated magnets comprise a first field emission structure and a second field emission structure. The first and second correlated magnets each comprise an array of field emission sources (discrete magnets, printed magnetic sources, or electromagnets) each having positions and polarities relating to a desired spatial force function that corresponds to the relative alignment of the first and second field emission structures within a field domain. The positions and polarities of each field emission source of each array of field emission sources can be determined in accordance with at least one correlation function. A separation distance between the first and second correlated magnets and their relative alignment creates a spatial force in accordance with the desired spatial force function, comprising at least one of an attractive force or a repellant force. The spatial force corresponds to a peak spatial force of said desired spatial force function when said first and second correlated magnets are substantially aligned such that each field emission source of the first correlated magnet substantially aligns with a corresponding field emission source of the correlated magnet. The non-peak, or non locking spatial force is less than the peak spatial force when the first and second field emission structures, or correlated magnets, are not substantially aligned such that field emission source of the first field emission structure substantially aligns with a corresponding field emission source of said second field emission structure.

The peak spatial force can be used to hold, or lock, two complementary correlated magnets together with a desired force. The peak spatial force can be used to hold, or lock, two identical correlated magnets apart with a desired force. If two complementary correlated magnets are secured to or incorporated within two objects, the complementary correlated magnets can be aligned to effectively lock two objects together with the desired spatial force. Because the desired spatial force is determined by the field emission sources in the correlated magnets, the desired attracting force of the aligned complementary correlated magnets can be set to a selected value by designing the correlated magnets accordingly. Consequently, two complementary correlated magnets can hold, or lock, two objects, or different parts of the same object, together with a preselected attracting force. This preselected locking force may be set, for example, to be 2 lbs, 3 lbs, 4 lbs, 5, lbs, 10 lbs, 15 lbs, 20, lbs, 25, lbs, 30 lbs, or more. When the complementary correlated magnets are moved relative to one another such that they are no longer substantially aligned, they are decorrelated from one another and the locking force is replaced by a non-peak force, or release force, that is substantially less than the locking force. Complementary correlated magnets can be designed to provide target locking and release forces that can be selected, for example, to allow the correlated magnets to be relatively easily separated when not aligned but relatively difficult to separate when aligned.

The spatial force of two repelling identical correlated magnets can also be used to hold, or lock, the two complementary correlated magnets apart with a desired force and used in the same way as correlated magnets having and attracting locking force.

The relative alignment of the first and second field emission structures can result from a relative movement of at least one of the first and second field emission structures with respect to the other along a path that can be a one-dimensional, a two-dimensional, or a three-dimensional movement path and can be linear, non-linear, rotational, cylindrical, spherical resulting from at least one of forward movement, backward movement, upward movement, downward movement, left movement, right movement, yaw, pitch, and or roll.

Generally, the spatial force functions of the present invention are in accordance with a code, where the code corresponds to a code modulo of first field emission sources and a complementary code modulo of second field emission sources. The code defines a peak spatial force corresponding to substantial alignment of the code modulo of the first field emission sources with the complementary code modulo of the second field emission sources. The code also defines a plurality of off peak spatial forces corresponding to a plurality of different misalignments of the code modulo of the first field emission sources and the complementary code modulo of the second field emission sources. The plurality of off peak spatial forces have a largest off peak spatial force, where the largest off peak spatial force is less than half of the peak spatial force.

FIG. 1A illustrates an example of a code that can be used to produce a linear array of magnetic field emission sources in a correlated magnet. A Barker length 7 code is used to determine polarities and positions of magnets making up a magnetic field emission structure, in this case a correlated magnet. Referring to FIG. 1A, a Barker length 7 code 500 is used to determine the polarities and the positions of magnets making up a magnetic field emission structure 502. Each magnet has the same or substantially the same magnetic field strength (or amplitude), which for the sake of this example is provided a unit of 1 (where A=Attract, R=Repel, A=−R, A=1, R=−1).

FIGS. 1B through 1O depict different alignments of two complementary magnetic field structures like that of FIG. 1A. A first magnetic field structure 502a is held stationary. A second magnetic field emission structure 502b that is identical to the first magnetic field emission structure 502a is shown sliding from left to right in 13 different alignments relative to the first magnetic field emission structure 502a in FIGS. 1B through 1O. The boundary where individual magnets of the two structures interact is referred to herein as an interface boundary. (Note that although the first magnetic field emission structure 502a is identical to the second magnetic field structure in terms of magnet field directions, the interfacing poles are of opposite or complementary polarity).

The total magnetic force between the first and second magnetic field emission structures 502a 502b is determined as the sum from left to right along the structure of the individual forces, at each magnet position, of each magnet or magnet pair interacting with its directly opposite corresponding magnet in the opposite magnetic field emission structure. Where only one magnet exists, the corresponding magnet is 0, and the force is 0. Where two magnets exist, the force is R for equal poles or A for opposite poles. Thus, for FIG. 1B, the first six positions to the left have no interaction. The one position in the center shows two "S" poles in contact for a repelling force of 1. The next six positions to the right have no interaction, for a total force of 1R=−1, a repelling force of magnitude 1.

A force vs. position function may alternatively be called a spatial force function. In other words, for each relative alignment, the number of magnet pairs that repel plus the number of magnet pairs that attract is calculated, where each alignment has a spatial force in accordance with a spatial force function based upon the correlation function and magnetic field strengths of the magnets. With the specific Barker code used, it can be observed from the figures that the spatial force varies from −1 to 7, where the peak occurs when the two magnetic field emission structures are aligned such that their respective codes are aligned as shown in FIG. 1H and FIG. 1I. FIG. 1H and FIG. 1I show the same alignment, which is repeated for continuity between the two columns of figures. The off peak spatial force, referred to as a side lobe force, varies from 0 to −1. As such, the spatial force function causes the magnetic field emission structures to generally repel each other unless they are aligned such that each of their magnets is correlated with a complementary magnet (i.e., a magnet's South pole aligns with another magnet's North pole, or vice versa). In other words, the two magnetic field emission structures substantially correlate when they are aligned such that they substantially mirror each other.

FIG. 1P depicts the sliding action shown in FIGS. 1B through 1O in a single diagram. In FIG. 1P, a first magnet structure 502a is stationary while a second magnet structure 502b is moved across the top of the first magnet structure 502a in one direction 508 according to a scale 504. The second magnet structure 502b is shown at position 1 according to an indicating pointer 506, which moves with the left magnet of the second structure 502b. FIG. 2 depicts the binary autocorrelation function 600 of the Barker length 7 code, where the values at each alignment position 1 through 13 correspond to the spatial force values calculated for the thirteen alignment positions shown in FIGS. 1B through 1O (and in FIG. 1P). As such, since the magnets making up the magnetic field emission structures 502a, 502b have the same magnetic field strengths. FIG. 2 depicts the spatial force function of the two magnetic field emission structures of FIGS. 1B-1O and 1P. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures will be complementary to (i.e., mirror images of) each other. This complementary autocorrelation relationship can be seen in FIG. 5b where the bottom face of the first magnetic field emission structure 502b having the pattern 'S S S N N S N' is shown interacting with the top face of the second magnetic field emission structure 502a having the pattern 'N N N S S N S', which is the mirror image (pattern) of the bottom face of the first magnetic field emission structure 502b.

Figure 3A:
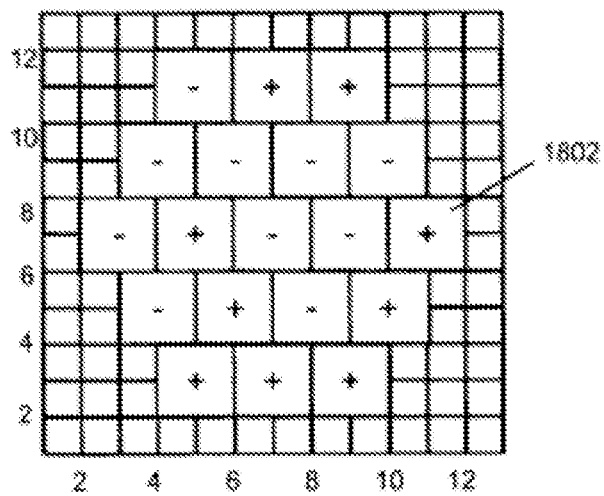
FIG. 3a-c illustrates a code to produce a 2-dimensional magnetic field emission structure and corresponding spatial force function.
Figure 3B:
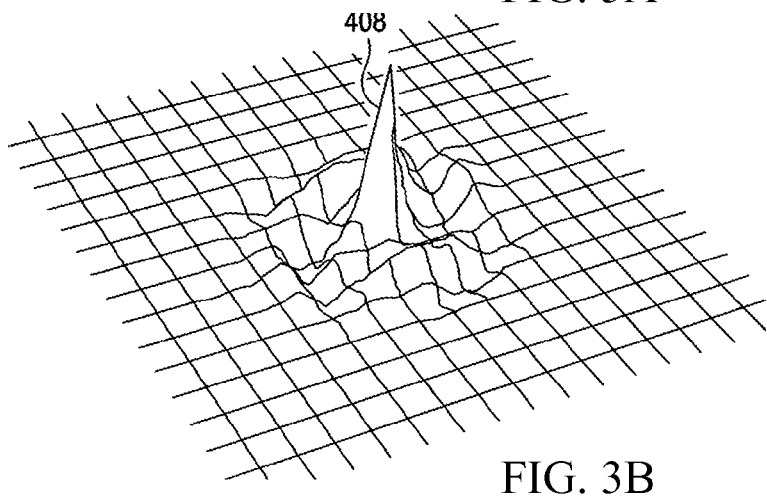
Figure 3C:
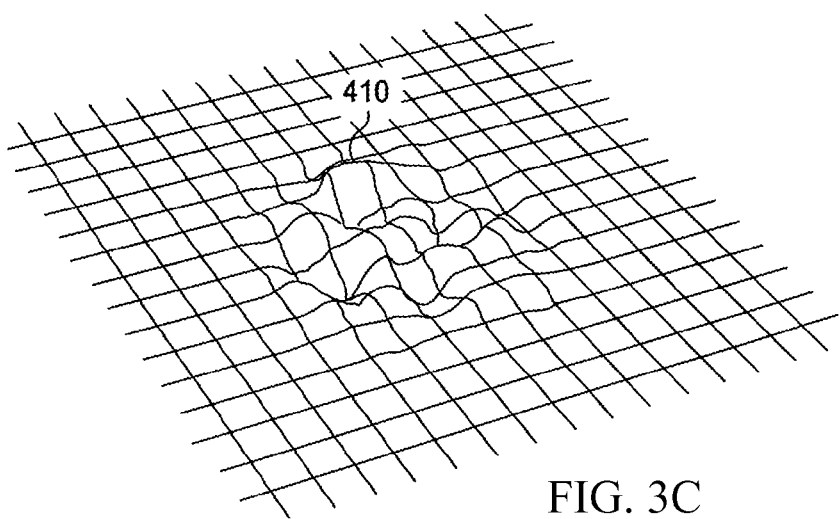
Figure 4A:
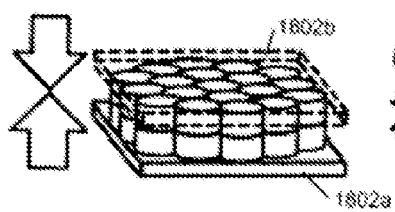
FIG. 4a-4i depict an exemplary complementary correlated magnet pair.

FIG. 3a depicts an exemplary code 1802 intended to produce a magnetic field emission structure, or correlated magnet, having a first stronger lock when aligned with its mirror image magnetic field emission structure and a second weaker lock when rotated 90° relative to its mirror image magnetic field emission structure. FIG. 4a shows magnet structure 1802 against a coordinate grid 1804. The magnet structure 1802 comprises magnets at positions: −1(3,7), −1(4,5), −1(4,7), +1(5,3), +1(5,7), −1(5,11), +1(6,5), +1(6,9), +1(7,3), −1(7,7), +1(7,11), −1(8,5), −1(8,9), +1(9,3), −1(9,7), +1(9,11), +1(10,5), −1(10,9)+1(11,7). Additional field emission structures may be derived by reversing the direction of the x coordinate or by reversing the direction of the y coordinate or by transposing the x and y coordinates. FIG. 3b depicts the peak spatial force function 1806 of a magnetic field emission structure 1802 interacting with its mirror image magnetic field emission structure when the two are substantially aligned. FIG. 3c depicts the spatial force function 1808 of magnetic field emission structure 1802 interacting with its mirror magnetic field emission structure after being rotated 90° with respect to aligned orientation. The peak occurs when substantially aligned but one structure rotated 90°.

Figure 4B:
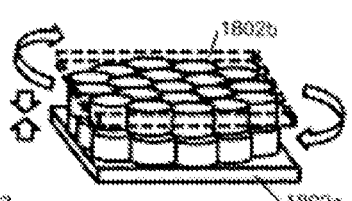
Figure 4C:
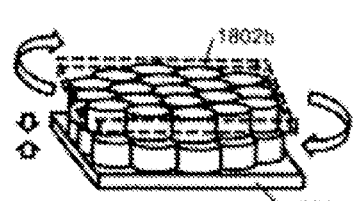
Figure 4D:
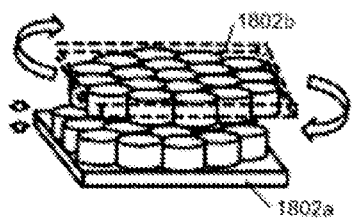
Figure 4E:
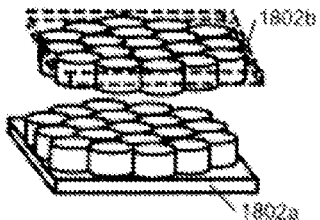
Figure 4F:
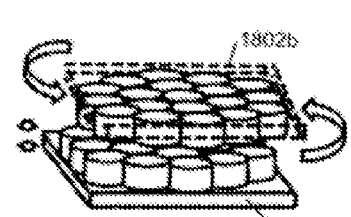
Figure 4G:
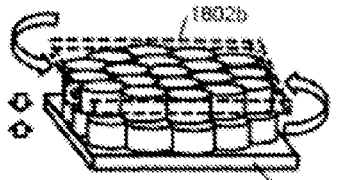
Figure 4H:
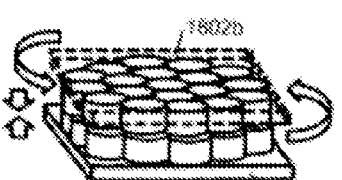
Figure 4I:
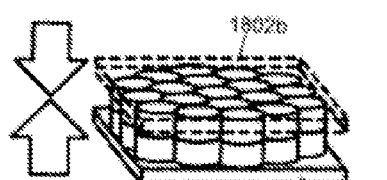

FIGS. 4a-4i depict the exemplary magnetic field emission structure 1802a and its mirror image magnetic field emission structure 1802b and the resulting spatial forces produced in accordance with their various alignments as they are twisted relative to each other. In FIG. 4a, the magnetic field emission structure 1802a and the mirror image magnetic field emission structure 1802b are aligned producing a peak spatial force. In FIG. 4b, the mirror image magnetic field emission structure 1802b is rotated clockwise slightly relative to the magnetic field emission structure 1802a and the attractive force reduces significantly. In FIG. 4c, the mirror image magnetic field emission structure 1802b is further rotated and the attractive force continues to decrease. In FIG. 4d, the mirror image magnetic field emission structure 1802b is still further rotated until the attractive force becomes very small, such that the two magnetic field emission structures are easily separated as shown in FIG. 4e. Given the two magnetic field emission structures held somewhat apart as in FIG. 4e, the structures can be moved closer and rotated towards alignment producing a small spatial force as in FIG. 4f. The spatial force increases as the two structures become more and more aligned in FIGS. 4g and 4h and a peak spatial force is achieved when aligned as in FIG. 4i. It should be noted that the direction of rotation was arbitrarily chosen and may be varied depending on the code employed. Additionally, the mirror image magnetic field emission structure 1802b is the mirror of magnetic field emission structure 1802a resulting in an attractive peak spatial force. The mirror image magnetic field emission structure 1802b could alternatively be coded such that when aligned with the magnetic field emission structure 1802a the peak spatial force would be a repelling force in which case the directions of the arrows used to indicate amplitude of the spatial force corresponding to the different alignments would be reversed such that the arrows faced away from each other.

Complementary correlated magnet pairs can be coded, for example, to produce a peak attractive force that is strong enough to prevent a small child, toddler, or pet from pulling the correlated magnets apart, but not so strong that an adult can't separate the aligned complementary correlated magnets. This can be useful, for example, if the correlated magnets are configured to be rotated relative to one another using a key-like turning mechanism and the key is not available. Some exemplary turning mechanisms that can be used to facilitate relative motion between correlated magnets and allow easy alignment and decorrelation are illustrated in FIGS. 5a-d.

FIG. 5a depicts two magnetic field emission structures 1802a and 1802b and with magnetic field emission structures 1802b including a turning mechanism 2000 that includes a tool insertion slot 2002. Both magnetic field emission structures include alignment marks 2004 along an axis 2003. A latch mechanism such as the hinged latch clip 2005a and latch knob 2005b may also be included preventing movement (particularly turning) of the magnetic field emission structures once aligned. Under one arrangement, a pivot mechanism (not shown) could be used to connect the two structures 1802a, 1802b at a pivot point such as at pivot location marks 2004 thereby allowing the two structures to be moved into or out of alignment via a circular motion about the pivot point (e.g., about the axis 2003). FIG. 5b depicts a first circular magnetic field emission structure housing 2006 and a second circular magnetic field emission structure housing 2008 configured such that the first housing 2006 can be inserted into the second housing 2008. The second housing 2008 is attached to an alternative turning mechanism 2010 that is connected to a swivel mechanism 2012 that would normally be attached to some other object. Also shown is a lever 2013 that can be used to provide turning leverage.

First housing 2006 and second housing 2008 can be used to mount or secure field emission structures (i.e. complementary correlated magnets) 1802a and 1802b to first and second objects to be locked together. For example, first housing 2006 containing correlated magnet 1802a can be secured to a door of an appliance or cabinet or the sliding portion of a drawer and second housing 2008 containing correlated magnet 1802b can be secured to a housing portion of the appliance, cabinet or drawer. Aligning the first and second complementary correlated magnets would lock the door of the appliance or cabinet door or drawer with a force equal to the peak, aligned attractive force of the correlated complementary magnets 1802a and 1802b. Similarly, first housing 2006 containing correlated magnet 1802a can be secured to an appliance control panel, electrical outlet, or light switch and second housing 2008 containing correlated magnet 1802b can be secured to a cover configured to prevent access to all or a portion of the appliance control panel, electrical outlet, or light switch. Aligning the first and second complementary correlated magnets would lock the cover to the appliance control panel, electrical outlet, or light switch with a force equal to the peak, aligned attractive force of the correlated complementary magnets 1802a and 1802b.

FIG. 5c depicts an exemplary gripping apparatus 2078 including a first part 2080 and a second part 2082. The first part 2080 comprises a saw tooth or stairs like structure where each tooth (or stair) has corresponding magnets making up a first magnetic field emission structure 2084a. The second part 2082 also comprises a saw tooth or stairs like structure where each tooth (or stair) has corresponding magnets making up a second magnetic field emission structure 2084b that is a mirror image of the first magnetic field emission structure 2084a. Under one arrangement each of the two parts shown are cross-sections of parts that have the same cross section as rotated up to 360° about a center axis 2086. FIG. 5d depicts an exemplary clasp mechanism 2090 including a first part 2092 and a second part 2094. The first part 2092 includes a first housing 2008 supporting a first magnetic field emission structure. The second part 2094 includes a second housing 2006 used to support a second magnetic field emission structure. The second housing 2006 includes raised guides 2022 that are configured to slide into guide slots 2024 of the first housing 2008. The first housing 2008 is also associated with a magnetic field emission structure slip ring mechanism 2096 that can be turned to rotate the magnetic field emission structure of the first part 2092 so as to align or misalign the two magnetic field emission structures of the clasp mechanism 2090.

While the slip ring mechanism 2096 is shown as having a hexagonal shape, the mechanism or any other mechanism for rotating or otherwise moving a 1-, 2-, or 3-dimensional correlated magnet relative to a complementary correlated magnet can have any convenient shape adapted to this purpose. For example, multiple correlated magnet pairs may be designed to use the same or differently shaped slots selected to be compatible with the same or different key-like turning mechanisms designed to be inserted into the slots. Differently or identically shaped protrusions such as triangles, squares, ovals, polygons stars, etc. may be placed on housings connected to correlated magnets and designed to work with tools adapted to fit onto these shapes in order to provide leverage for twisting one correlated magnet relative to its complementary correlated magnet.

The first and second of complementary pair of correlated magnets can be secured to, or incorporated as integral parts of, two different objects or different parts of the same object. By aligning the complementary correlated magnets, the two objects or different parts of the same object can be locked together with the attractive force of the peak, aligned force of the aligned complementary correlated magnets. Each of the complementary correlated magnets may, for example, be each independently be secured or attached to an object directly or indirectly by means of an adhesive, one or more screws, bolts, ties, or straps, or the correlated magnets may be an integral part of an object. For example, a plastic or glass object may be cast in a mold containing a correlated magnet.

Figure 6:
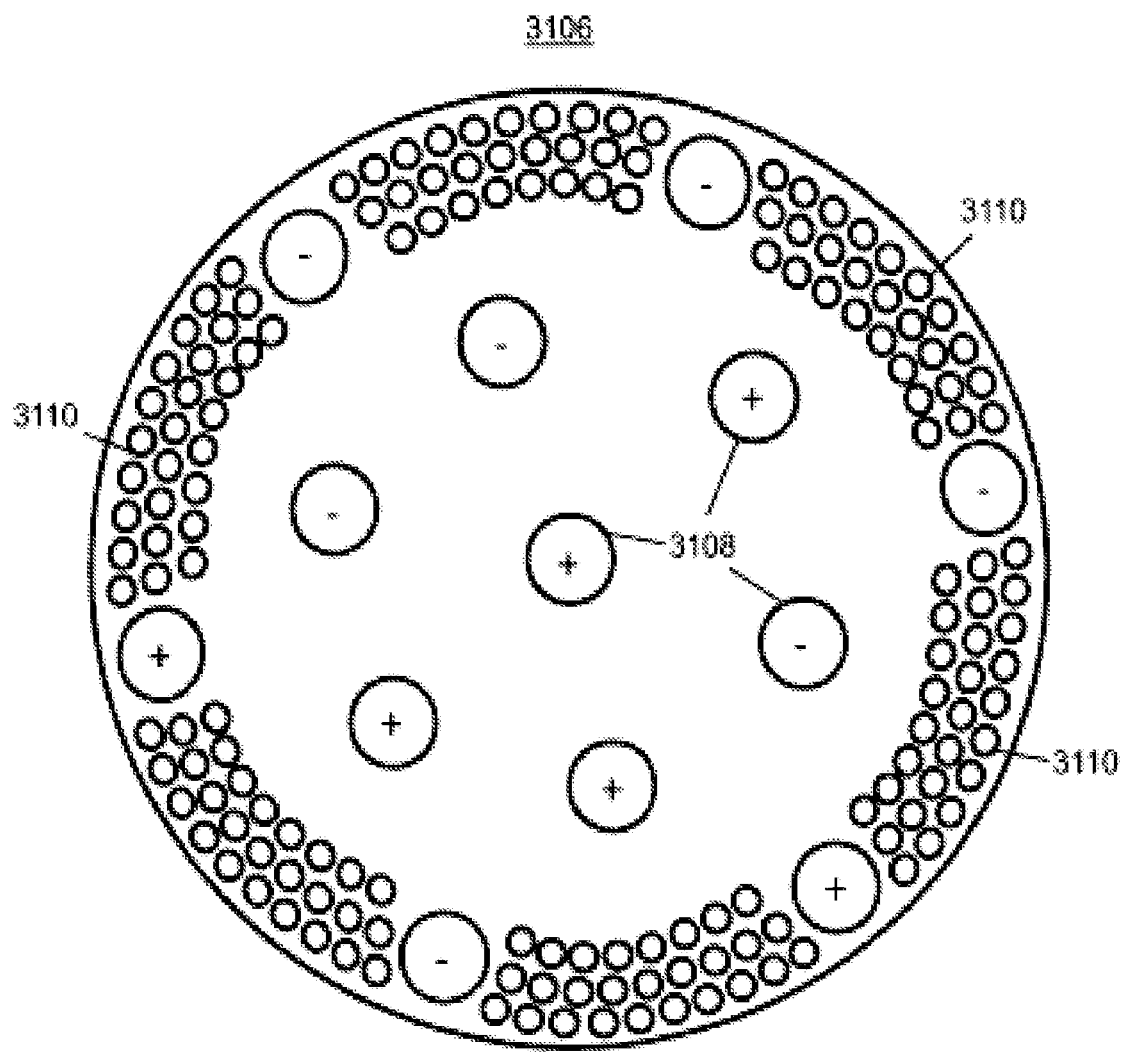
FIG. 6 depicts a magnetic field emission structure used to produce an attracting-repelling correlated magnet pair.

FIG. 6 depicts a magnetic field emission structure 3106 made up of a sparse array of large magnetic field sources 3108 combined with a large number of smaller magnetic field sources 3110 whereby alignment with a mirror image magnetic field emission structure would be provided by the large sources and a repel force would be provided by the smaller sources. Generally, the larger (i.e., stronger) magnets achieve a significant attraction force (or repelling force) at a greater separation distance than smaller magnets. Combinational structures having magnetic field sources of different strengths can be constructed that effectively have two (or more) spatial force functions corresponding to the different levels of magnetic strengths employed. As the magnetic field emission structures are brought closer together, the spatial force function of the strongest magnets is first to engage and the spatial force functions of the weaker magnets will engage when the magnetic field emission structures are moved close enough together at which the spatial force functions of the different sized magnets will combine. The sparse array of stronger magnets 3108 is coded such that it can correlate with a mirror image sparse array of comparable magnets. However, the number and polarity of the smaller (i.e., weaker) magnets 3110 can be tailored such that when the two magnetic field emission structures are substantially close together, the magnetic force of the smaller magnets can overtake that of the larger magnets 3108 such that an equilibrium will be achieved at some distance between the two magnetic field emission structures. Combinations of correlated and non-correlated magnets can be used together, for example, the weaker magnets 3110 of FIG. 6 may all be uncorrelated magnets. Complementary correlated magnets having an attract—repel equilibrium allow the construction of correlated magnet locks that leave a gap distance between aligned, complementary correlated magnets. Such locks may be useful in cases where two surfaces preferably do not form a seal in order, for example to allow for ventilation.

Figure 7A:
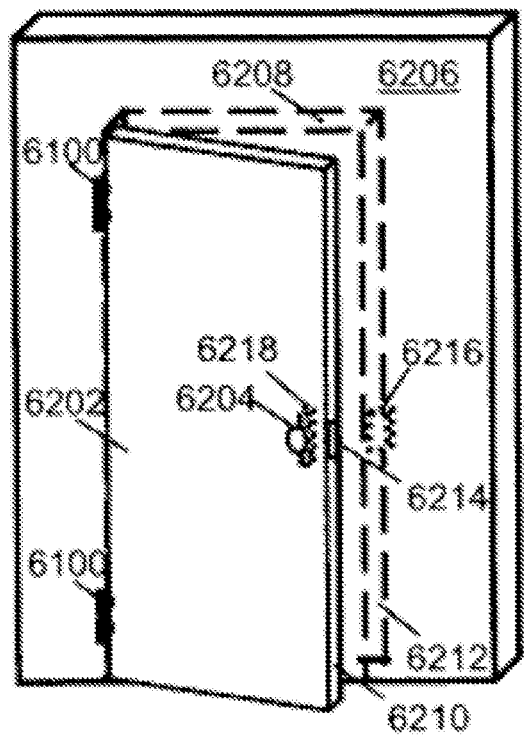
FIGS. 7a, 7b and 7c depict a correlated magnetic locking mechanism comprising two pairs of complementary correlated magnets.

FIG. 7a shows an appliance or cabinet door or lid 6202 and two hinges 6100 that connect the door/lid 6202 to an inside edge 6208 of a compartment portion or wall 6206 of an appliance or cabinet. When the door 6202 is closed the right side 6210 is substantially close to and alongside a right inside surface 6212 of the inside edge 6208. A first open area 6214 is located in the right side 6210 of the door 6202. A second open area 6216 is located inside the right inside surface 6212 of the compartment wall 6206 such that, when the door/lid 6202 is closed, the first and second open areas 6214, 6216 are substantially co-located thereby allowing an exemplary door locking mechanism 6218 that is located inside the first open area 6214 in the door/lid 6202 and is attached to a knob 6204. As the knob 6204 is turned clockwise or counter clockwise, the locking mechanism 6218 rotates to its locked and unlocked positions, respectively.

Figure 7B:
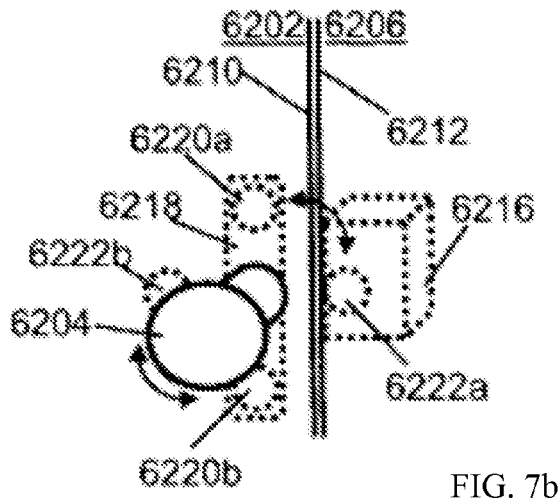
Figure 7C:
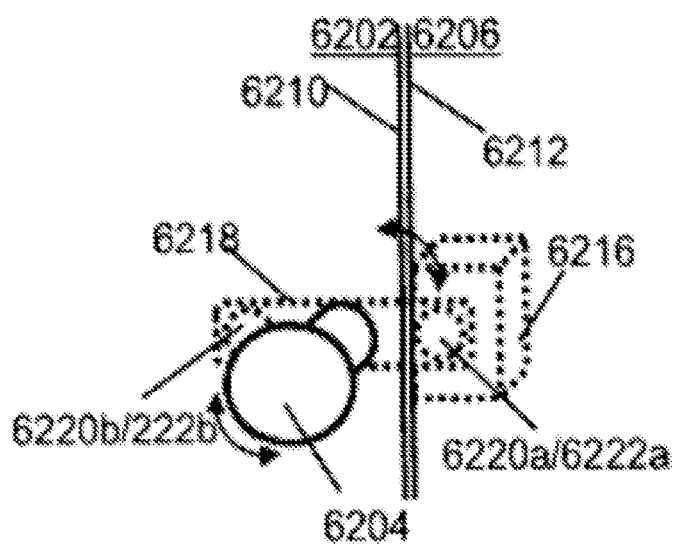

FIG. 7*b* depicts the appliance/cabinet locking mechanism 6218 shown in FIG. 7*a* in an unlocked position. The locking mechanism 6218 includes first correlated magnets 6220*a*, 6220*b*. Shown mounted inside the first open area 6214 of the door 6202 and inside the second open area 6216 inside the compartment wall 6206 are second correlated magnets 6222*a*, 6222*b*. First correlated magnets 6220*a*, 6220*b* are complementary to the second correlated magnets 6222*a*, 6222*b* such that, when they are substantially aligned, the door/lid is locked with the combined peak attractive forces of the two pairs of correlated magnets 6220*a*, 6222*a* and 6220*b*, 6222*b*, as shown in FIG. 7*c*. The use of two sets of complementary first and second correlated magnets is exemplary and one skilled in the art will recognize that only one set of complementary first and second field emission structures is required for locking purposes. Furthermore, many different designs could be employed for the locking mechanism 6218 and for the field emission structures themselves. Additionally, a magnetic locking mechanism can be used with a drawer or sliding door rather than a door having hinges 6100.

FIGS. 8*a*-8*f* depict exemplary appliance/cabinet door latch mechanisms in which a first and/or a second complementary correlated magnet is secured to a housing portion and/or a door of an appliance, cabinet, drawer, or electrical outlet or switch by a latch mechanism. The latch mechanism 6900 includes a first correlated magnet 6902*a* and a second correlated magnet 6902*b* that is complementary to the first correlated magnets 6902*a*. The second correlated magnet 6902*b* is associated with a latch body 6904 and is configured to rotate about an axis 6905. The second correlated magnet 6902*b* is integrated into the latch body 6904 and a turning mechanism 6906 is provided outside the latch body for turning the structure 6902*b*. The first correlated magnet 6902*a* is associated with a door 6910*a*. A hinge 6908 is used to attach the latch body 6904 to a housing portion or a second door. When fully assembled, the first correlated magnet 6902*a* associated with the door 6910*a* can be aligned with the second correlated magnet 6902*b* associated with the latch body 6904 (and thus the second object 6910*b*) such that the structures 6902*a*, 6902*b* produce an attractive force that secures, or locks, the door latch mechanism 6900 thereby securing the door and housing portion or second door 6910*a*, 6910*b* to each other. The turning mechanism can be turned to decorrelate the two correlated magnets, enabling the latch body to be lifted to unlatch the door latch mechanism. Although a hinge is depicted, one skilled in the art will recognize that various other mechanisms other than a hinge can be used such as a sliding mechanism or a strap. Alternatively, the second magnetic field structure 6902*b* might reside on the outside of the latch body 6904.

Under one arrangement, depicted in FIG. 8*c*, the turning mechanism is associated with the first correlated magnet 6902*a* in which case the second correlated magnet 6902*b* is fixed and the first correlated magnet 6902*a* is configured to turn about an axis 6905. Under another arrangement, the turning mechanism is integrated with a magnetic field structure and requires a tool for turning. Under such an arrangement, the turning mechanism and magnetic field structure may not be visible. Generally, all sorts of configurations are possible for latch mechanisms comprising a first and second correlated magnets that are complementary to each other where the first correlated magnet is associated with a first object and the second structure is associated with a second object.

FIG. 8*d* depicts the use of the latch mechanism 6900 on top of two doors, which is useful for applications such as medicine cabinets, fence gates, and baby gates. The latch mechanism can similarly be used on the bottom of two doors. FIG. 8*d* also depicts use of the latch mechanism 6900 on the front of two doors, which is useful for storage cabinet doors, closet doors, and the like. The latch mechanism can similarly be used on the back side of two doors (or a door and a door frame), which is useful for security purposes.

FIG. 8*e* depicts an alternative latch body 6914 consisting of a material 6916 having associated with it a first correlated magnet 6902*a* that is fixed to or integrated within the material 6916. The alternative latch body 6914 can be installed in a cabinet, drawer, or appliance opening, or a surface of an electrical outlet or light switch 6918 and is configured to attach to a second correlated magnet 6902*b* associated with a door, lid, or cover 6910*c* when aligned with the first magnetic field structure 6902*a* so as to lock the door, lid, or cover to the cabinet, appliance, electric outlet, or switch. A turning mechanism 6906 can optionally be used to turn the second structure in order to detach the two structures 6902*a*, 6902*b*.

FIG. 8*f* depicts an exemplary cabinet and cabinet door and the use of alternative latch body 6914.

Generally, latch mechanisms in accordance with the invention can be used for all sorts of applications such as for securing cabinets (e.g., kitchen, bathroom, medicine cabinets), drawers, appliances (i.e., oven, dishwasher, clothes washer, dryer, microwave, etc.) and protective covers for electrical outlets and light switches. Such latch mechanisms are ideal for child safety applications and applications it is desirable that animals (e.g., pets, raccoons, etc.) be unable to unlatch a latch mechanism.

While particular embodiments of the invention have been described, it will be understood, however, that the invention is not limited thereto, since modifications may be made by those skilled in the art, particularly in light of the foregoing teachings.

The invention claimed is:

1. A correlated magnet lock comprising:
   a first correlated magnet securely attachable to a first location on a first object and
   a second correlated magnet that is complementary to said first correlated magnet and securely attachable to either a second location on said first object or a second object,
   said first correlated magnet being capable of being aligned with said second correlated magnet such that said first and second correlated magnets produce an attractive force that secures said first location on said first object either to said second location on said first object or to said second object, said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

2. The correlated magnet lock of claim 1, wherein:
   the correlated magnet lock is configured to lock a door of an appliance or cabinet;
   said first correlated magnet is securely attachable to a first door of said appliance or cabinet;

said second correlated magnet is securely attachable to a compartment portion or a second door of said appliance or cabinet; and said first correlated magnet is configured to be alignable with said second correlated magnet such that an attractive force is produced that locks said first door to said compartment portion or second door.

3. The correlated magnet lock of claim 2, further comprising a turning mechanism adapted to be applied to said first or said second correlated magnet to decorrelate said first or said second correlated magnet and thereby enabling said first door to be opened.

4. The correlated magnet lock of claim 2, wherein said first and second correlated magnets are attachable to said first door and said second door or compartment with an adhesive or said first and second correlated magnets are integratable into said first door and said second door or compartment.

5. The correlated magnet lock of claim 2, wherein said first and/or said second correlated magnet are attachable to said first door and/or said second door or compartment indirectly by a strap, a latch or a locking mechanism.

6. The correlated magnet lock of claim 1, wherein:
the correlated magnetic lock is an appliance door lock;
said first correlated magnet is securely attachable to a compartment section of an appliance;
said second correlated magnet is integrated with a door overlapping member adapted to protrude over said door to secure said door to said compartment portion of said appliance; and
aligning said first correlated magnet with said second correlated magnet produces an attractive force that secures said door to said compartment.

7. The correlated magnet appliance door lock of claim 6, further comprising a turning mechanism adapted to be applied to said first or said second correlated magnet to decorrelate said first or said second correlated magnet enabling said door to be unlatched and opened.

8. The correlated magnet appliance door lock of claim 6, wherein said door overlapping member is adapted to rotate such that said second correlated magnet decorrelates from said first correlated magnet and thereby enabling said door to be opened.

9. The correlated magnet appliance door lock of claim 6, wherein said first correlated magnet is attachable to said compartment with an adhesive or is integrated into said compartment.

10. The correlated magnet lock of claim 6, wherein said first and/or said second correlated magnet are attachable to said door and/or said compartment indirectly by a strap, a latch or a locking mechanism.

11. The correlated magnet appliance door lock of claim 6, wherein said door overlapping member fully detaches from said first correlated magnet upon rotation and decorrelation of said second correlated magnet from said first correlated magnet.

12. The correlated magnet lock of claim 1, wherein:
the correlated magnetic lock is configured to prevent the opening of a drawer;
said first correlated magnet is securely attachable to a face of said drawer;
said second correlated magnet is securely attachable to a frame containing said drawer; and
wherein said first correlated magnet is configured to be alignable with said second correlated magnet such that the opening of said drawer is prevented.

13. The correlated magnet lock of claim 12, further comprising a turning mechanism adapted to be applied to said first or said second correlated magnet to decorrelate said first or said second correlated magnet enabling said drawer to be opened.

14. The correlated magnet lock of claim 12, wherein said first and second correlated magnets are attachable to said drawer face and said drawer frame with an adhesive or are integrable into said drawer face and said drawer frame.

15. The correlated magnet lock of claim 12, wherein said first and/or said second correlated magnet is attachable to said drawer and/or said frame indirectly by a strap, a latch or a locking mechanism.

16. A method of locking a first object to a second object comprising the steps of:
a) securing a first correlated magnet to said first object;
b) securing a second correlated magnet that is complementary to said first correlated magnet to said second object; and
c) aligning said first correlated magnet with said second correlated magnet such that an attractive force is produced between said first and second correlated magnets and thereby securing said first object to said second object, said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

17. The method of claim 16, wherein:
said first object is an appliance or cabinet door;
said second object is a compartment portion of said appliance or cabinet door; and
aligning said first correlated magnet with said second correlated magnet produces an attractive force between said first and second correlated magnets that secures said appliance or cabinet door to said compartment.

18. The method of claim 17, further comprising applying a turning mechanism to said first or said second correlated magnet to decorrelate said first or said second correlated magnet enabling said appliance or cabinet door to be opened.

19. The method of claim 17, further comprising attaching said first and/or second correlated magnets to said door and/or said compartment with an adhesive or a latching mechanism.

20. The method of claim 17, further comprising integrating said first and second correlated magnets into said door and said compartment.

21. A child proof locking system, comprising:
a compartment portion of an appliance or cabinet comprising a first correlated magnet; and
a door covering at least a portion of said compartment portion, said door comprising a second correlated magnet that is complementary to said first correlated magnet;
wherein said first correlated magnet is configured to be alignable with said second correlated magnet so as to produce an attractive force that secures said door to said compartment, said attractive force being a peak spatial force of a spatial force function, said spatial force function corresponding to a code modulo defined by a code, said code modulo defining said peak spatial force and a plurality of off peak spatial forces, said plurality of off peak spatial forces having a largest off peak spatial force, said largest off peak spatial force being less than half of the peak spatial force.

22. The system of claim 21, further comprising a turning mechanism adapted to be applied to said first and/or said second correlated magnet to decorrelate said first and said second correlated magnets and thereby enabling said door to be opened from said compartment.

23. The correlated magnet lock of claim 1, wherein:
the correlated magnetic lock is configured to lock a cover for an electrical outlet or an electrical switch into a position such that said cover covers said electrical outlet or electrical switch;
said first correlated magnet is securely attachable to said cover; and
said second correlated magnet is securely attachable to a structure associated with said electrical outlet or electrical switch.

24. The correlated magnet lock of claim 23, further comprising a turning mechanism adapted to be applied to said first or said second correlated magnet to decorrelate said first or said second correlated magnet and thereby enabling said lock to be opened.

25. The correlated magnet lock of claim 23, wherein said first and second correlated magnets are attachable to said cover and said structure with an adhesive or said first and second correlated magnets are integratable into said cover and said structure.

26. The correlated magnet lock of claim 23, wherein said first and/or said second correlated magnet are attachable to said cover and/or said structure indirectly by a strap, a latch or a locking mechanism.

27. The correlated magnet lock of claim 23, wherein said cover comprises a non-conductive insert comprising a plurality of prongs protruding from a substantially flat portion perpendicular to said prongs, said prongs formed to fit into a dimension of a predetermined electrical outlet.

* * * * *